United States Patent [19]

Nakajima

[11] Patent Number: 5,632,040
[45] Date of Patent: May 20, 1997

[54] MICROCOMPUTER HAVING REDUCED POWER CONSUMPTION THROUGH IMPEDANCE CONTROL AND FREQUENCY REDUCTION

[75] Inventor: Toyokatsu Nakajima, Hyogo, Japan

[73] Assignees: Mitsubishi Electric Semiconductor Software Co., Ltd., Hyogo; Mitsubishi Denki Kabushiki Kaisha, Tokyo, both of Japan

[21] Appl. No.: 564,940

[22] Filed: Nov. 30, 1995

[30] Foreign Application Priority Data

Jul. 24, 1995 [JP] Japan .................... 7-187255

[51] Int. Cl.$^6$ .................... G06F 1/26; G06F 1/32
[52] U.S. Cl. .................... 395/750; 364/707; 364/273.1; 364/273.2; 364/273.3; 364/DIG. 1; 395/558
[58] Field of Search .................... 395/750, 775, 395/550; 364/707, 492; 365/227; 327/542; 307/66, 48, 34

[56] References Cited

U.S. PATENT DOCUMENTS

| | | | |
|---|---|---|---|
| 4,570,219 | 2/1986 | Shibukawa et al. | 395/775 |
| 4,670,837 | 6/1987 | Sheets | 395/550 |
| 5,021,679 | 6/1991 | Fairbanks et al. | 307/66 |
| 5,153,535 | 10/1992 | Fairbanks et al. | 331/143 |
| 5,184,025 | 2/1993 | McCurry et al. | 307/66 |
| 5,426,755 | 6/1995 | Yokouchi et al. | 395/428 |
| 5,442,314 | 8/1995 | Hara | 327/543 |
| 5,461,266 | 10/1995 | Koreeda et al. | 307/125 |
| 5,469,561 | 11/1995 | Takeda | 395/550 |

*Primary Examiner*—Gopal C. Ray
*Attorney, Agent, or Firm*—Leydig, Voit & Mayer

[57] ABSTRACT

A microcomputer comprising a clock circuit which selects a pulse signal as a system clock of the microcomputer from among a plurality of pulse signals and a power source impedance controlling circuit which controls an impedance between a power input terminal and the units of the microcomputer based on the frequency of the pulse signal selected by the clock circuit to provide the electric power to the units of the microcomputer. The power source impedance controlling circuit controls the impedance such that the power source impedance is made lower as the frequency of the selected pulse signal is higher.

18 Claims, 15 Drawing Sheets

F I G. 3

| CLOCK REGISTER | SYSTEM CLOCK | POWER SOURCE IMPEDANCE |
|---|---|---|
| H | HIGH SPEED | LOW |
| L | LOW SPEED | HIGH |

FIG. 12

| MODE REGISTER | CLOCK REGISTER | IMPEDANCE REGISTER | SYSTEM CLOCK | POWER SOURCE IMPEDANCE |
|---|---|---|---|---|
| L | L | L | SLOW SPEED | HIGH |
| L | L | H | SLOW SPEED | HIGH |
| L | H | L | HIGH SPEED | LOW |
| L | H | H | HIGH SPEED | LOW |
| H | L | L | SLOW SPEED | HIGH |
| H | L | H | SLOW SPEED | LOW |
| H | H | L | HIGH SPEED | HIGH |
| H | H | H | HIGH SPEED | LOW |

POWER CURRENT CHARACTERISTICS IN A CASE WHERE A RESISTOR IS INSERTED

MICROCOMPUTER HAVING REDUCED POWER CONSUMPTION THROUGH IMPEDANCE CONTROL AND FREQUENCY REDUCTION

BACKGROUND OF THE INVENTION

1. Field of the Invention

This invention relates to a computer such as a single-chip microcomputer, particularly to reduction of power consumption of the computer.

2. Description of the Related Art

A single-chip microcomputer used in a portable apparatus has a variety of power consumption modes. One of them is a mode of selecting a frequency of a system clock.

FIG. 14 is a block diagram showing a configuration of an oscillating circuit and the peripheral portion of the oscillating circuit of a conventional single-chip microcomputer which has a function of selecting a frequency of the system clock. In this figure, reference numeral 1 denotes an oscillating circuit which outputs a pulse signal having a predetermined frequency, 2 denotes a frequency divider which divides the frequency of the pulse signal outputted from the oscillating circuit 1, 3 denotes a selector which selects one as a system clock between a pulse signal outputted from the oscillating circuit 1 and a pulse signal outputted from the frequency divider 2, 4 denotes a register in which a signal to drive the selector 3 is stored. For example, when an "H" signal is stored in the register 4, the selector 3 selects a signal outputted from the oscillating circuit 1 and when an "L" signal is stored in the register 4, the selector 3 selects a signal outputted from the frequency divider 2.

A program which runs on a single-chip microcomputer consists of variety of modules and each of the modules requires a certain processing speed. For example, a module which polls reception of events does not require a high speed of processing, whereas a module performing a large amount of calculations requires a high speed of processing. Therefore, when a module which does not require a high speed processing is performed in a program, the program writes an "L" signal in the register 4, thereby the pulse signal S2 outputted from the frequency divider 2 is selected as a system clock and the single-chip microcomputer operates according to this system clock of the pulse signal S2 outputted from the frequency divider 2. On the other hand, when a module which requires a high speed processing is performed in a program, the program writes an "H" signal in the register 4, thereby the pulse signal S1 is selected as a system clock and the single-chip microcomputer operates according to this system clock of the pulse signal S1 outputted from the oscillating circuit 1.

When processing may be performed at a low speed, power consumption of the single-chip microcomputer is reduced by decreasing a frequency of a system clock.

As shown in FIG. 15, there is another conventional single-chip microcomputer which is configured such that it comprises two frequency dividers 2a and 2b and the selector 3a selects one of output signals from the oscillating circuit 1, the dividers 2a and 2b by writing data in the two-bit register 4a. With this configuration, a system clock can be selected from three frequencies.

As explained above, the conventional microcomputer realizes low power consumption by changing frequency of a system clock. However, a microcomputer which operates at much lower power is being desired from demands for smaller size of batteries and for longer time usage.

SUMMARY OF THE INVENTION

The present invention is made in view of the demands explained above and accordingly the objective of the present invention is to provide a microcomputer which can reduce electric power consumption.

In order to accomplish the above objective, a microcomputer of this invention comprises: pulse signal generating means for generating a plurality of pulse signals having frequencies which are different from each other; pulse signal selecting means for selecting a pulse signal from among the plurality of the pulse signals based on a selection signal inputted to the pulse signal selecting means and for outputting the selected pulse signal as the system clock; and power source impedance controlling means for controlling an impedance between a power input terminal and units of the microcomputer based on a frequency of the selected pulse signal and for providing the inputted electric power to the units of the microcomputer.

Further, a microcomputer comprises: pulse signal generating means for generating a plurality of pulse signals frequencies of which are different from each other; pulse signal selecting means for selecting a pulse signal from among the plurality of the pulse signals based on a selection signal inputted to the pulse signal selecting means and for outputting the selected pulse signal as the system clock; power source impedance controlling means for controlling an impedance between a power input terminal and a first part of units of the microcomputer based on a frequency of the selected pulse signal and for providing the inputted electric power to the first part of the units of the microcomputer; electric power providing means for providing a second part of the units of the microcomputer with the electric power inputted to the power input terminal. With this configuration, the electric power without impedance control is supplied to the second part of the units as well as a low electric power consumption is realized.

Further, a microcomputer of this invention is made such that the power source impedance controlling means makes lower a value of an impedance between the power input terminal and the units of the microcomputer when a frequency of the selected pulse signal becomes higher.

Further, a microcomputer of this invention is made such that the pulse signal selecting means includes: a clock register for storing information as to selection of one pulse signal from among the plurality of the pulse signals under a write operation of the central processing unit; and a clock selector for selecting one pulse signal from among the plurality of the pulse signals based on the information stored in the clock register.

Further, a microcomputer of this invention is made such that it further comprises: an impedance register for storing information as to impedance control by the power source impedance controlling means under a write operation of the microcomputer; and a signal outputting means for outputting a signal indicative of making the impedance lower when the information stored in the impedance register indicates that the impedance should be made lower even when the information stored in the clock register indicates that the impedance should be made higher. With this configuration, freedom in controlling the power source impedance is increased and a low electric power consumption is realized without degrading the precision of a certain processing.

Further, a microcomputer of this invention is made such that it further comprises: an impedance register for storing information as to impedance control by the power source impedance controlling means under a write operation of the microcomputer; a mode register for storing information under a write operation of the central processing unit as to selection of one mode between a system clock associated mode in which the impedance is controlled based on the information stored in the clock register and an independent mode in which the impedance is controlled based on the information stored in the impedance register independently of the information stored in the clock register; and signal outputting means for outputting a signal from the clock register when the information indicative of the system clock associated mode is stored in the mode register and for outputting a signal from the impedance register when the information indicative of the independent mode is stored in the mode register. With this configuration, a low electric power consumption is realized by controlling a power source impedance independently of the system clock. Moreover, spurious such as electromagnetic radiation from the power source can be reduced.

Further a microcomputer of the present invention is made such that the clock register has a function to store information indicative of one preselected pulse signal from among the plurality of the pulse signals in the clock register when the microcomputer is reset. With this configuration, the amount of processing of the program is reduced because it is not necessary to perform a writing operation by a program to the clock register after the computer is reset.

Further, a microcomputer of this invention is made such that the power source impedance controlling means includes: a resistor connected serially to the power input terminal; and a power source selector for selecting a circuit line between a circuit line connected to the power input terminal via the resistor and a circuit line connected directly to the power input terminal.

Further, a microcomputer of this invention is made such that the power source impedance controlling means includes: a plurality of transistors having on-resistance values different from each other, each of the transistors being serially connected to the power input terminal; and a power source selector for selecting a circuit line from among circuit lines via the plurality of transistors respectively by turning on a corresponding transistor. With this configuration, a low electric power consumption is realized without using a resistor.

Further, a microcomputer of this invention is made such that the second part of the units of the microcomputer includes an analog circuit. With this configuration, degrading of precision of the analog circuit can be avoided even if the system clock has a low frequency.

BRIEF DESCRIPTION OF THE DRAWINGS

FIG. 3 is a table showing the relationship among a value written in the clock register, a system clock and power source impedance in the first embodiment.

FIG. 12 is a table showing statuses of a system clock and a power source impedance when an "L" signal or an "H" signal is written in the mode register, the clock register and the impedance register, respectively.

DETAILED DESCRIPTION OF THE PREFERRED EMBODIMENTS

The preferred embodiments of the present invention will be explained with reference to the drawings.

EMBODIMENT 1.

Figure 1:
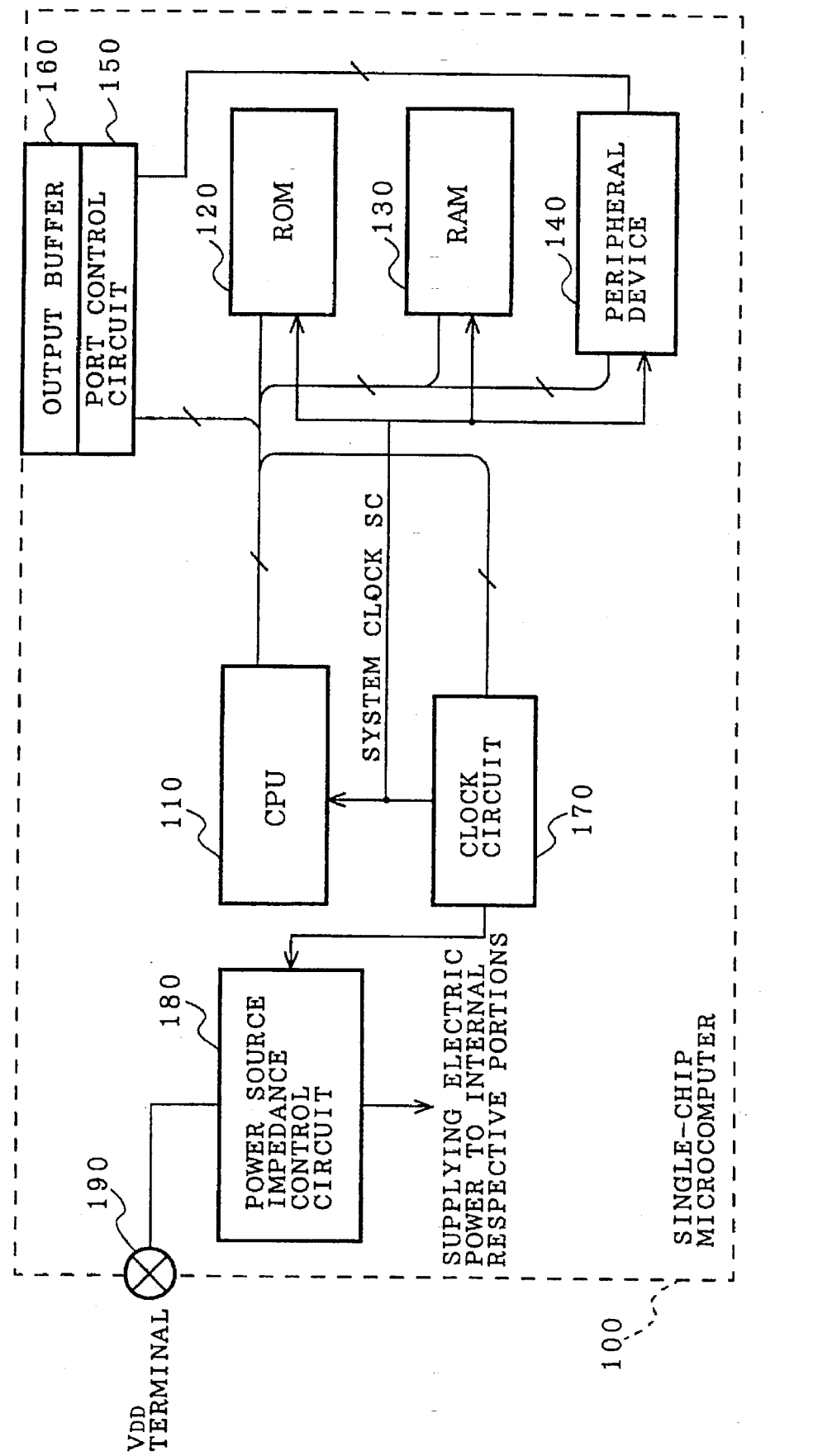
FIG. 1 is a block diagram showing the configuration of the single-chip microcomputer according to the first embodiment of the present invention.

FIG. 1 is a block diagram showing the configuration of the single-chip microcomputer according to the first embodiment of the present invention. Reference numeral 100 denotes a single-chip microcomputer, 110 denotes a Central Processing Unit (CPU), 120 denotes a Read Only Memory (ROM) which stores a program, data and so forth, 130 denotes a Random Access Memory (RAM) serving as a working area during the program runs for example, 140 denotes a peripheral device such as an A/D converter or a timer, 150 denotes a port control circuit for controlling an input/output port for data communication between an external device and the microcomputer 100, 180 denotes an output buffer for buffering the data to be outputted to an outside device, 170 denotes a clock circuit which supplies a system clock to the respective units including the CPU 110, 180 denotes a power source impedance control circuit which changes power source impedance based on an instruction from the CPU 110, 190 denotes a $V_{DD}$ terminal for supplying electric power to the single-chip microcomputer 100 from the outside.

Figure 2:
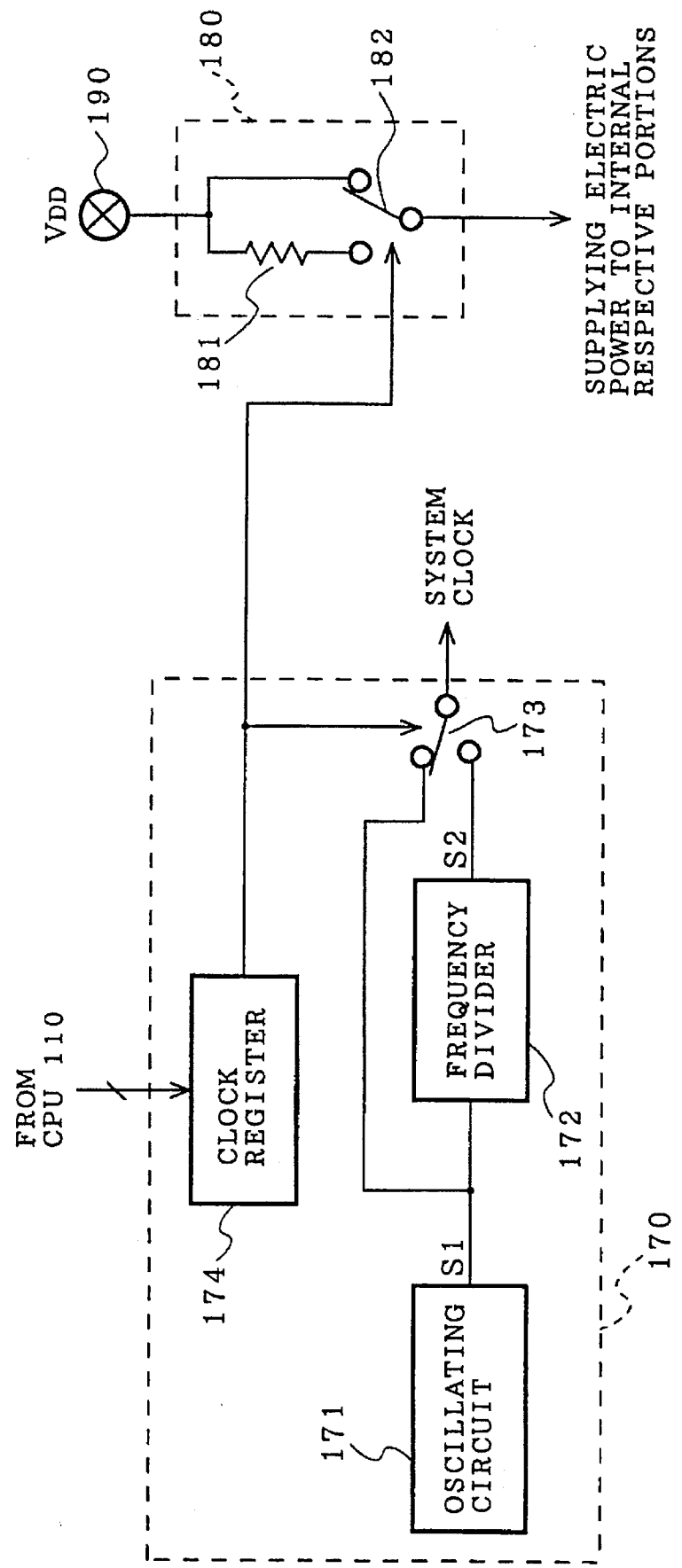
FIG. 2 is a block diagram showing a configuration of the clock circuit and the power source impedance control circuit which are shown in FIG. 1.

FIG. 2 is a block diagram showing a configuration of the clock circuit 170 and the power source impedance control circuit 180, Which are shown in FIG. 1. Reference numeral 171 denotes an oscillating circuit which produces a predetermined frequency pulse signal S1 using a crystal, 172 denotes a frequency divider which divides a frequency of the pulse signal S1 outputted from the oscillating circuit 171, 173 denotes a clock selector which selects one between the pulse signal S1 outputted from the oscillating circuit 171 and the pulse signal S2 outputted from the frequency divider 172, 174 denotes a clock register which stores the information as to the selection of the clock selector 173 and by writing an "H" signal or an "L" signal under the control of the CPU 110, the clock selector 173 is driven. Reference numeral 181 denotes a resistor one terminal of which is connected to $V_{DD}$ terminal 190, 182 denotes a power source selector which selects one between the electric power supplied directly from the $V_{DD}$ terminal 190 and the electric power supplied via the resistor 181 according to the value stored in the clock register 174 and which provides the selected electric power to the respective internal parts of the single-chip microcomputer 100.

When a high speed event of the program stored in the ROM 120 is performed, the CPU writes an "H" signal in the clock register 174 of the clock circuit 170. When an "H" signal is written in the clock register 174, the clock selector 173 selects the pulse signal S1 outputted from the oscillating circuit 171 and outputs it as a system clock signal. Further, when an "H" signal is written in the clock register 174, the power selector 182 selects the electric power supplied directly from the $V_{DD}$ terminal 190 and provides it to the internal respective portions of the single-chip microcomputer. Therefore, when the program requires a high speed processing, an "H" signal is written in the clock register 174, thereby the pulse signal S1 from the oscillating circuit is selected as a system clock and electric power supplied directly from the $V_{DD}$ terminal is provided to the internal respective portions of the single-chip microcomputer 100.

On the other hand, an event which does not require a high speed processing is performed, the CPU 110 writes an "L" signal in the clock register 174 in the clock circuit 170. When an "L" signal is written in the clock register 174, clock selector 173 selects the pulse signal S2 outputted from the frequency divider 172 and outputs the selected signal as a system clock signal. Further, the power source selector 182 provides electric power via the resistor 181 to the internal respective portions. Therefore, when the program does not require a high speed processing and a decrease in electric power consumption is desired, an "L" signal is written in the clock register 174, thereby the pulse signal S2 outputted from the frequency divider 172 is selected as a system clock and electric power is supplied via the resistor 181.

FIG. 3 is a table showing the relationship among a value written in the clock register 174, a system clock and power source impedance. As indicated in FIG. 3, when a system clock has a high speed, the power source impedance is set low. When the power source impedance is low, i.e., when electric power is directly provided without using the resistor 181, the current supplying capabilities of the internal respective transistors are increased with the result that a power source current is increased, thereby power consumption is increased. However, the internal devices such as the CPU 110 may operate at a high speed. On the other hand, when a system clock has a low speed, the power source impedance is set high. When the power source impedance is high, i.e., when electric power is provided via the resistor 181 to the internal portions, the current supplying capabilities of the internal respective transistors are decreased with the result that power current is decreased, thereby power consumption is reduced.

Insertion of the resistor 181 to a power line causes the switching speed of respective elements of the internal portions to become lower. However, the decrease of switching speed does not affect the overall processing speed because a system clock is also changed to a slow speed. In other words, it is necessary at a time of designing a computer to determine a value of the resistor 181 such that the respective elements whose switching speeds are set slow due to the insertion of the resistor 181 can follow the low speed system clock.

Figure 13:
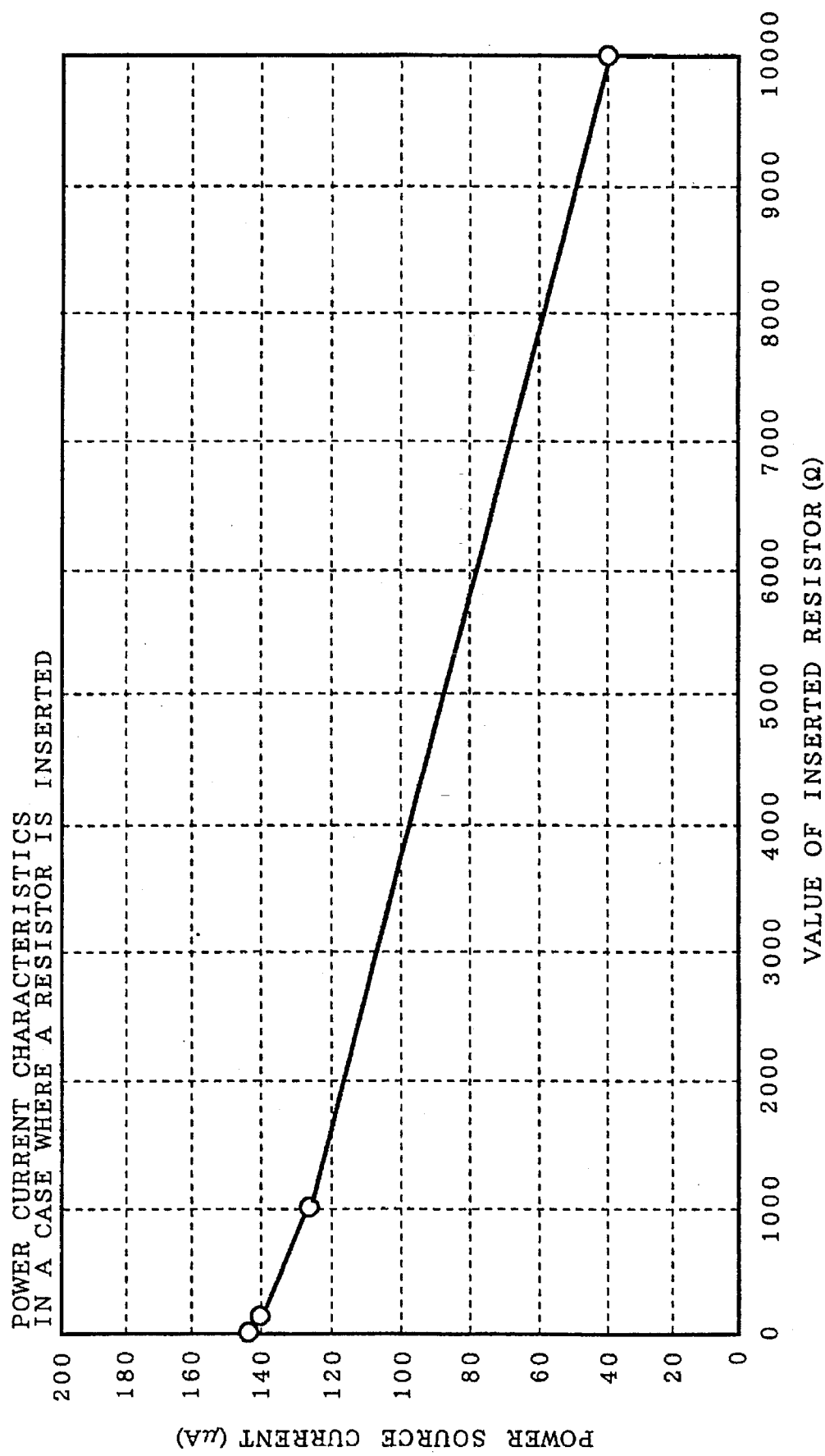
FIG. 13 is a graph showing the relationship between a resistance value inserted serially to the power line of the 4-bit microcomputer which can operate at the maximum of 1 MHz and power current value supplied to the microcomputer.
Figure 14:
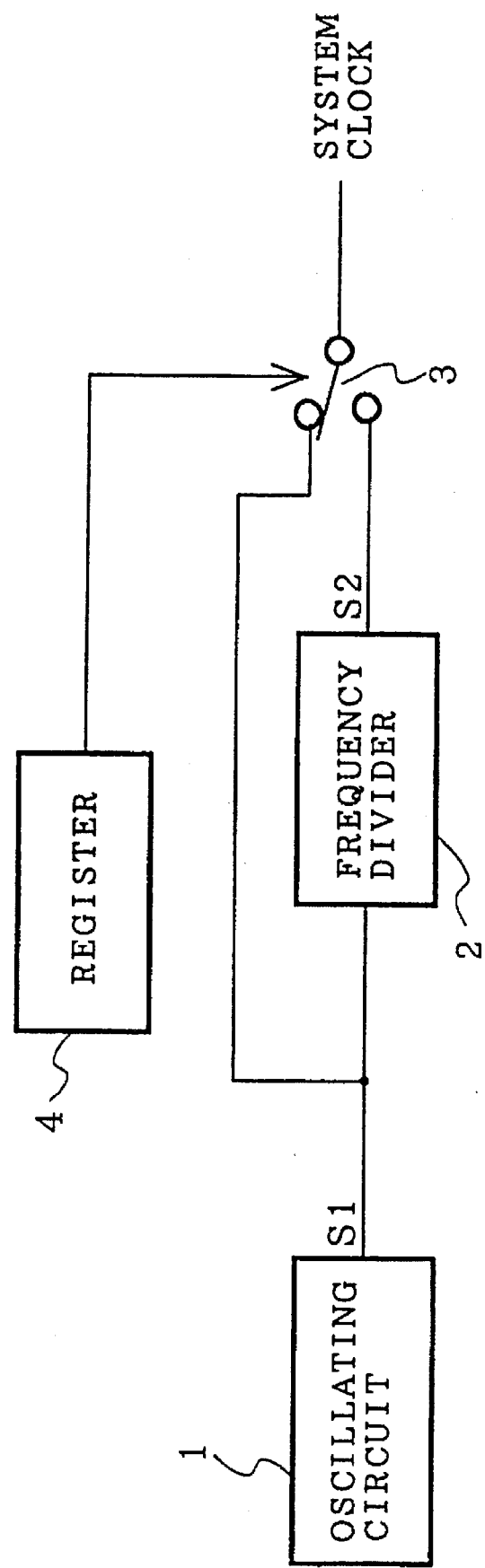
FIG. 14 is a block diagram showing a configuration of oscillating circuit and the peripheral portion of the oscillating circuit of a conventional single-chip microcomputer which has a function of selecting a frequency of the system clock.
Figure 15:
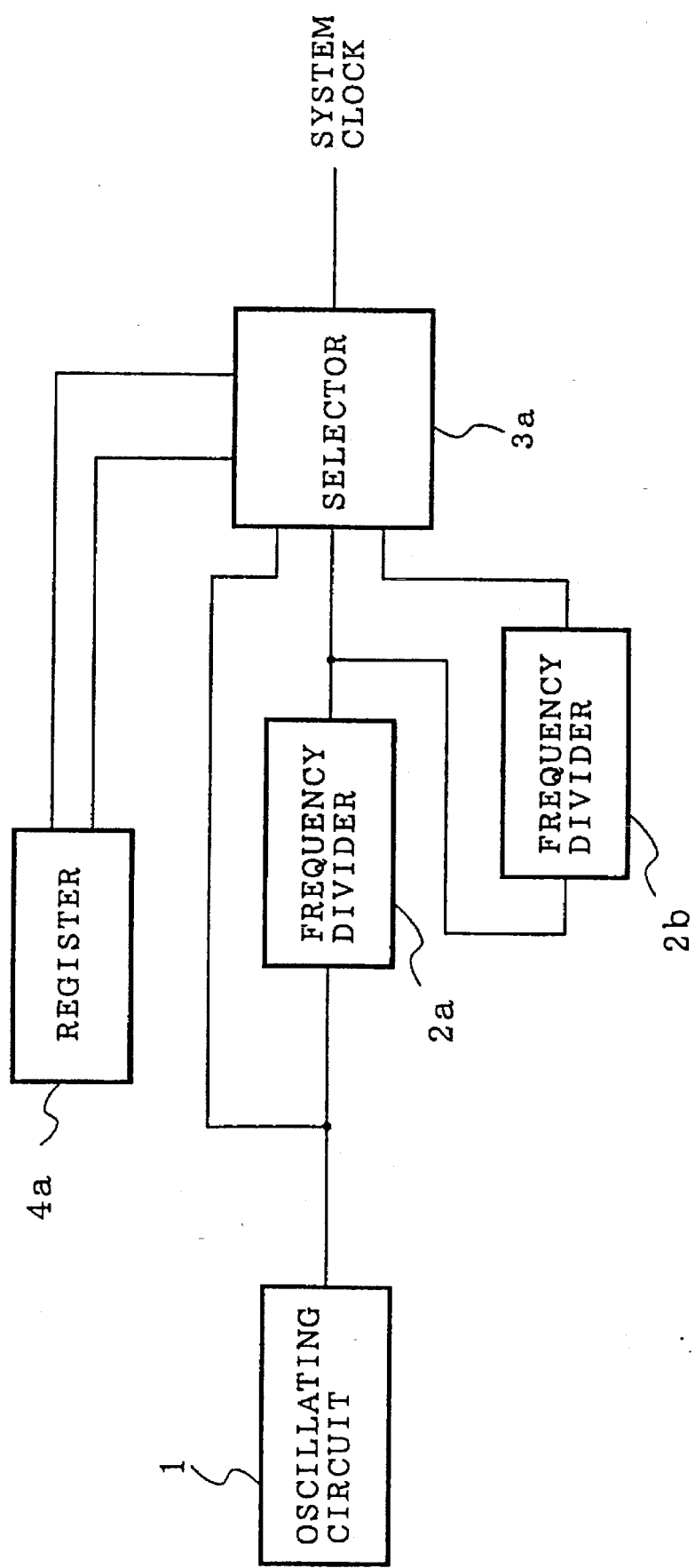
FIG. 15 is a block diagram showing a configuration of oscillating circuit and the peripheral portion of the oscillating circuit of a conventional single-chip microcomputer with a plurality of frequency dividers, which has a function of selecting a frequency of the system clock.

FIG. 13 is a graph showing the relationship between a resistance value inserted serially to the power line of the 4-bit microcomputer which can operate at the maximum of 1 MHz and power current value supplied to the microcomputer. As indicated in FIG. 13, as the resistance value increases, the power source current decreases.

The values in the clock register can be used inversely. Namely, the microcomputer 100 can be designed such that a system clock speed is set high and a power source impedance is selected to be low when an "L" signal is written, and a system clock speed is set low and a power source impedance is selected to be high when an "H" signal is written.

Figure 4:
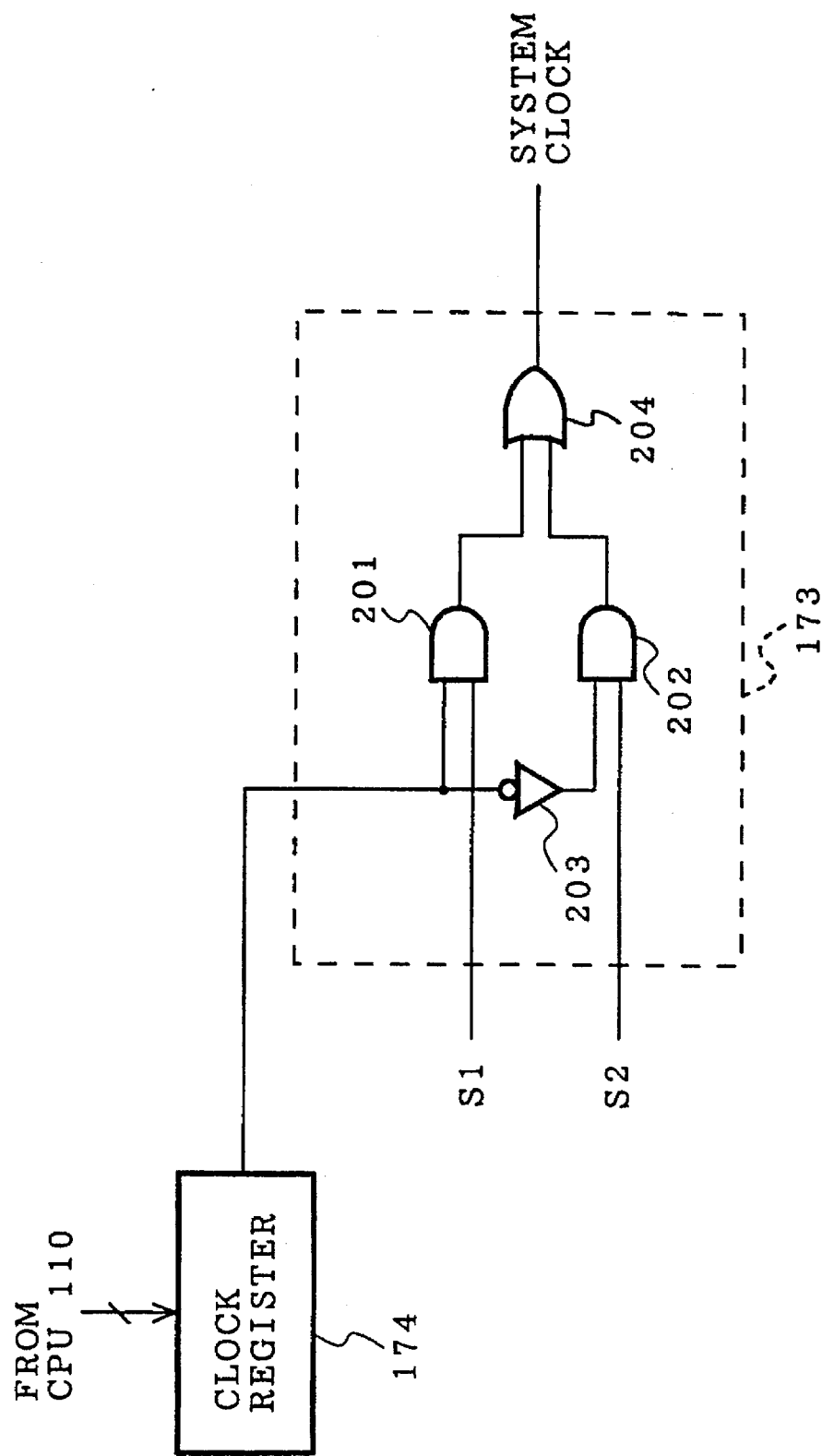
FIG. 4 is a circuit diagram of the clock selector in a case where it consists of gate circuits.

FIG. 4 is a circuit diagram of the clock selector 173 in a case where it consists of gate circuits. Reference numerals 201, 202 denote an AND gate, 203 denotes an inverter, 204 denotes an OR gate. When an "L" signal is written in the clock register 174 under the control of the CPU 110, an "L" signal is inputted to one of the input terminals of the AND gate 201 and an "H" signal which has been inverted by the inverter 203 is inputted to one of the input terminals of the AND gate 202. Therefore, the signal S2 inputted to the AND gate 202 is selected and the selected signal S2 is outputted from the OR gate 204. On the other hand, when an "H" signal is written in the clock register 174, the signal S1 inputted to the AND gate 201 is selected and the selected signal S1 is outputted from the OR gate 204. FIG. 4 illustrates the simplest example of the clock selector 173. In the actual circuit, a circuit is provided for prohibiting hazard signals which are produced when the clock is changed.

Figure 5:
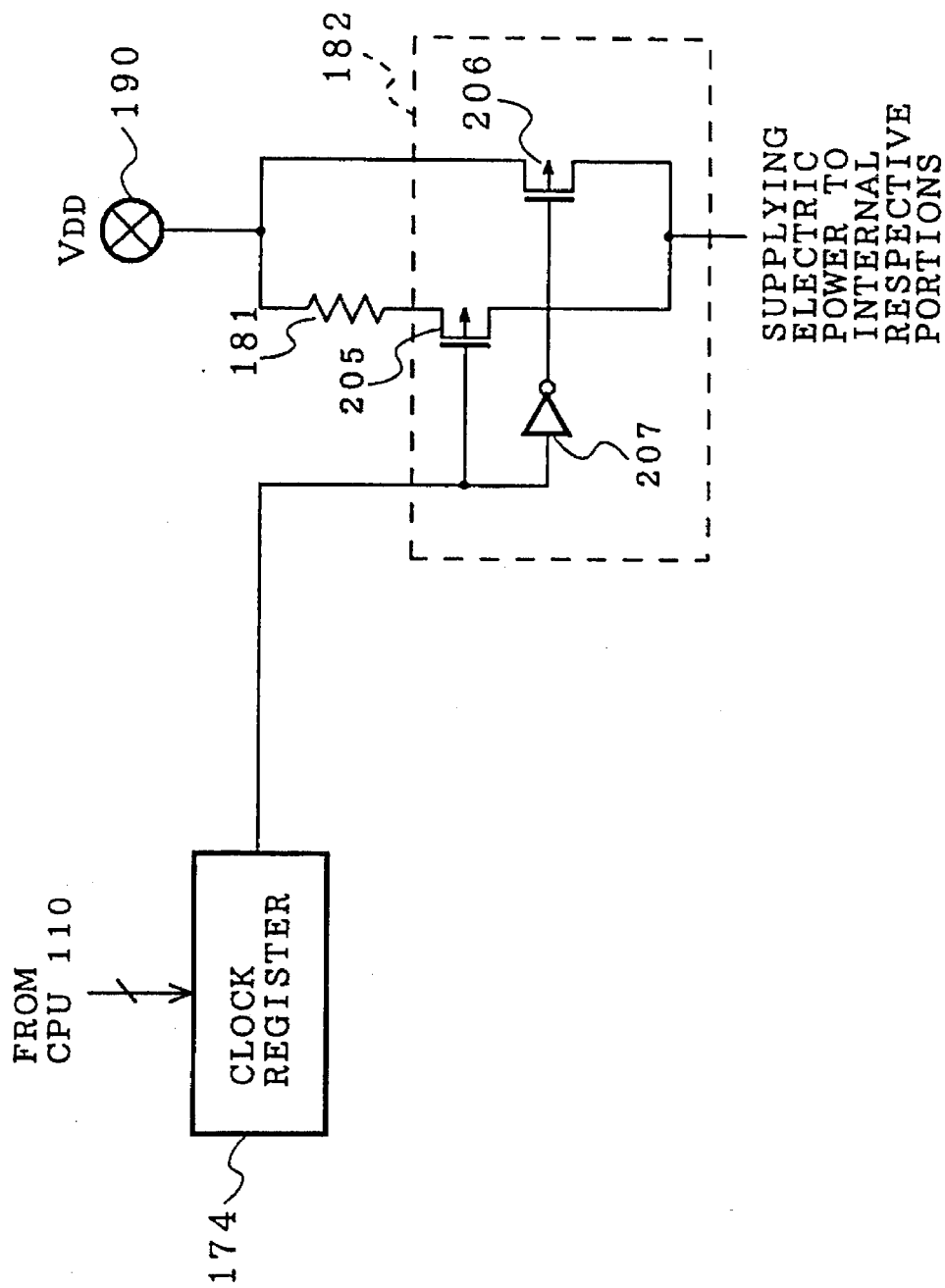
FIG. 5 is an exemplary circuit diagram of the power source selector.

FIG. 5 is an exemplary circuit diagram of the power source selector 182 indicated in FIG. 2. Reference numerals 205, 206 denote P-channel transistor serving as a switching element, 207 denotes an inverter. When an "L" signal is written in the clock register 174 under the control of the CPU 110, an "L" signal is inputted to the gate of the transistor 205 thereby it is turned on. An "H" signal which has been inverted by the inverter 207 is inputted to the gate of the transistor 206, thereby it is turned off. Thus, a power source line of a high impedance with the insertion of the resistor 181 is selected. On the other hand, when an "H" signal is written in the clock register 174, the transistor 205 is turned off and the transistor 206 is turned on, thereby a low impedance line without insertion of the resistor 181 is selected.

Figure 6:
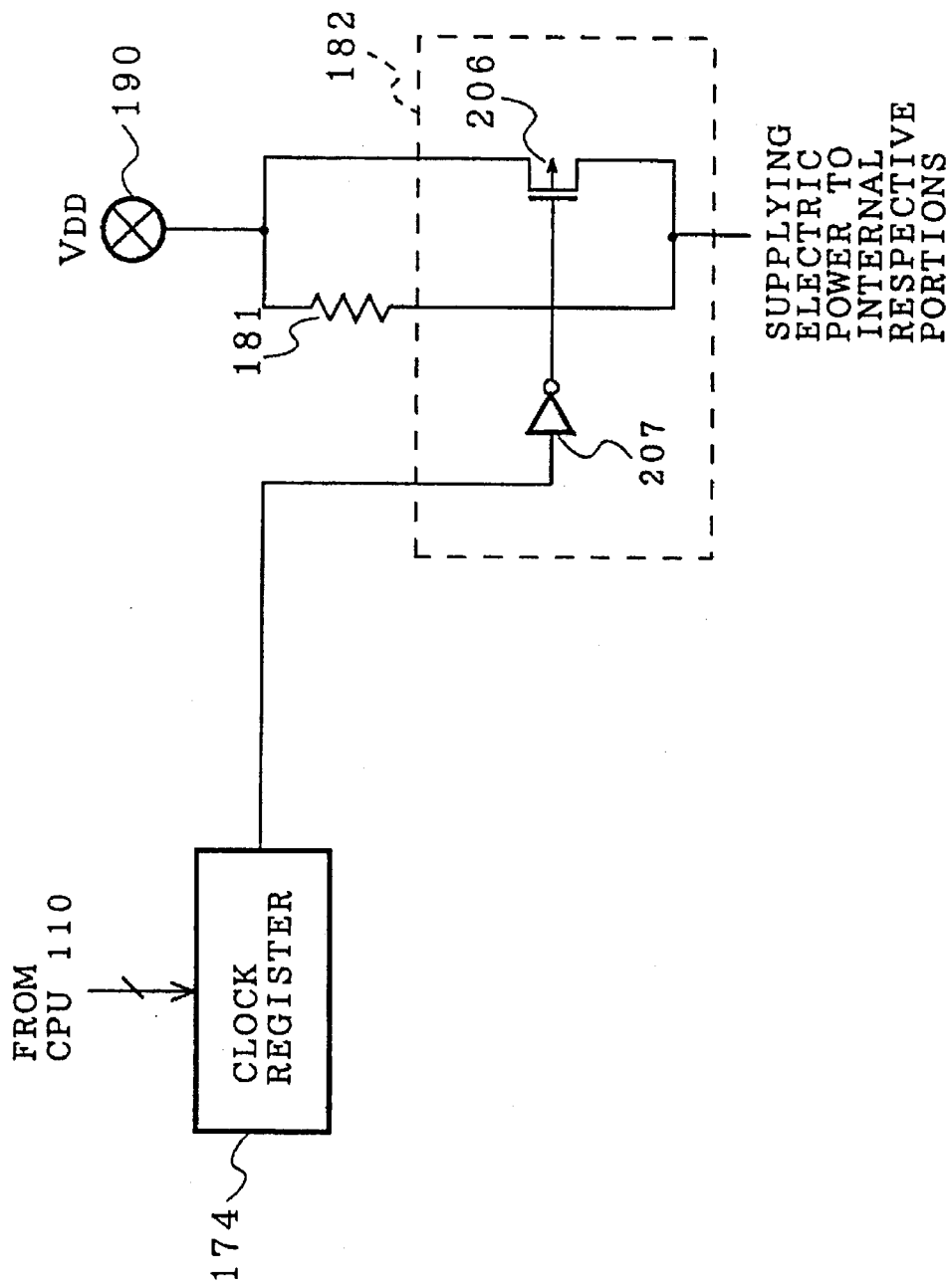
FIG. 6 is another exemplary circuit diagram of the power source selector.

FIG. 6 is another exemplary circuit diagram of the power source selector 182 indicated in FIG. 2. The same reference numerals are attached to the same portions as those in FIG. 4 and duplicate explanation is omitted. In this circuit, the transistor 205 of the power source selector 182 shown in FIG. 5 is eliminated. Therefore, the high impedance line is not turned off when the low impedance line is selected. Namely, when an "H" signal is written in the clock register 174, the transistor 206 is turned off and the resistor 181 is maintained in connection with the transistor 206 in parallel. However, the on-resistance value of the transistor 206 is much smaller than that of the resistor 181 so that the circuit of FIG. 6 can operate substantially in the same way as the circuit of FIG. 5.

Figure 7:
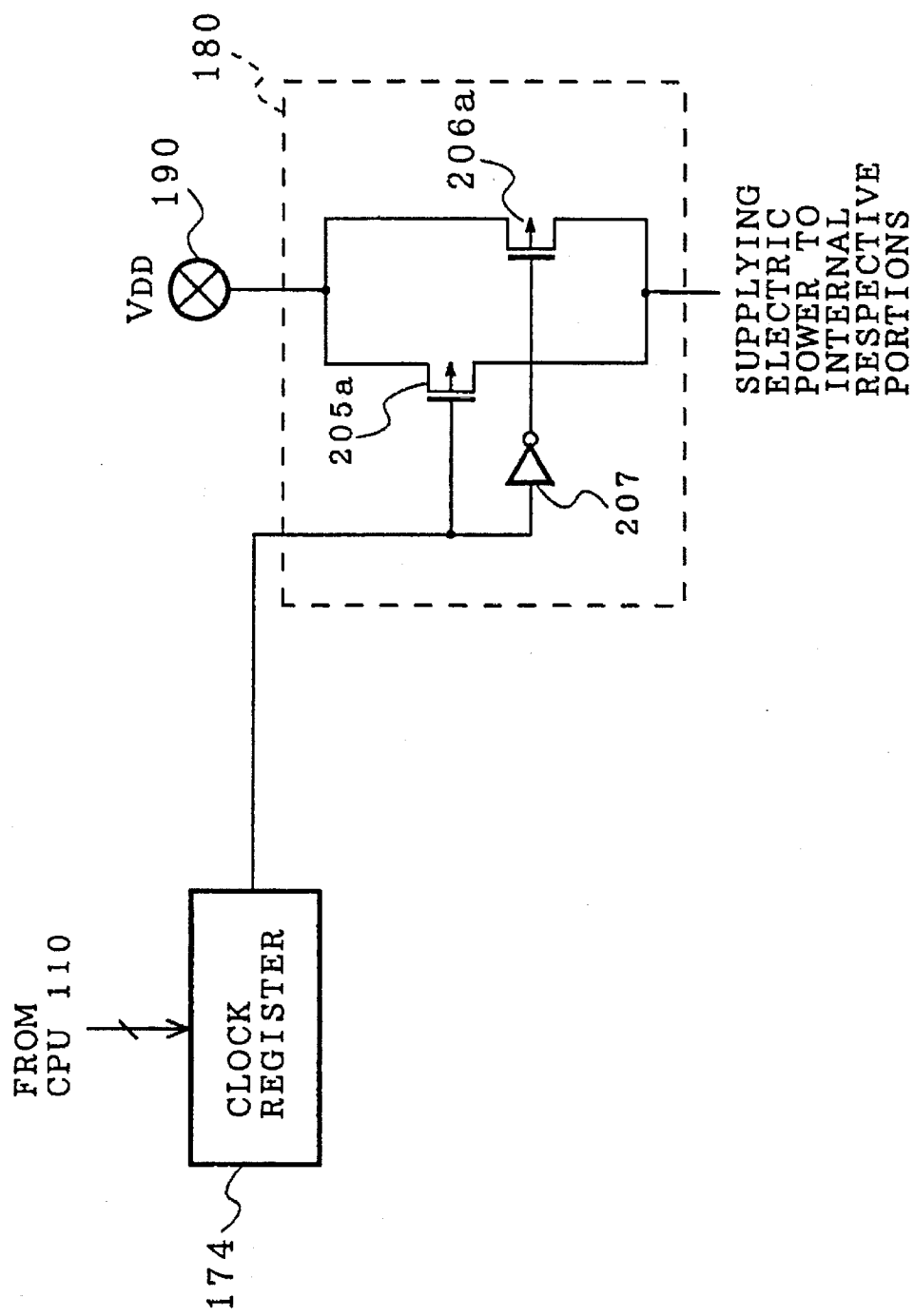
FIG. 7 is another exemplary circuit diagram of power source impedance circuit.

FIG. 7 is another exemplary circuit diagram of power source impedance circuit 180 shown in FIG. 2. The same reference numerals are attached to the same portions as those in FIG. 6 and duplicate explanation is omitted. Reference numerals 205a and 206a denote a P-channel transistor. The on-resistance value of the transistor 205a is set larger than that of the transistor 206a. That is, driving capability of the transistor 206a is larger than that of the transistor 205a. Therefore, a high impedance line including the transistor 205a and a low impedance line including the transistor 206a are realized without using a resistor, thereby the circuit of FIG. 6 can obtain the same effects as those of the power source impedance circuit 180 shown in FIG. 2.

EMBODIMENT 2.

A single-chip microcomputer of this embodiment is based on the fundamental structure shown in FIG. 1 and duplicate explanations are omitted.

Figure 8:
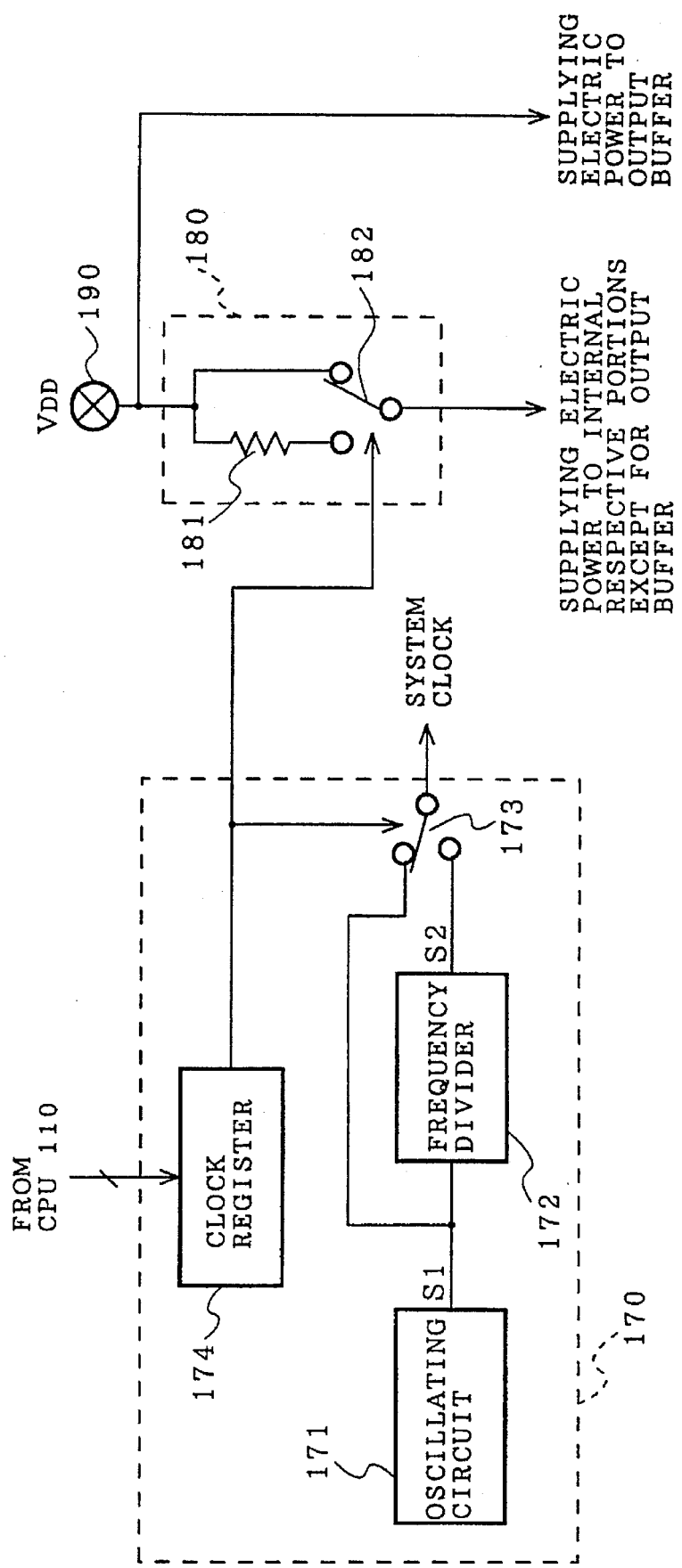
FIG. 8 is a block diagram showing a configuration of the clock circuit, the power source impedance control circuit and the periphery thereof in the single-chip microcomputer according to the second embodiment.

FIG. 8 is a block diagram showing a configuration of the clock circuit 170, the power source impedance control circuit 180 and the periphery thereof in the single-chip microcomputer 100 according to this embodiment.

In this embodiment, the electric power is always directly provided to the output buffer 160 (the second portion) irrespective of a value written in the clock register 174. On the other hand, one of the low impedance power line and a high impedance power line is selected based on a value written in the clock register 174 similarly to the first embodiment, i.e., based on a frequency of the system clock and the electric power is provided to the portion other than the output buffer 160 (the first portion) via the selected power line. In this embodiment, the electric power is always directly provided to the output buffer 160 from the $V_{DD}$ terminal 190 in view of the fact that the output buffer 160 requires a relatively large amount of electric power.

In the above explanation, electric power is provided directly from the $V_{DD}$ terminal 190 to the output buffer 160. However, it is also effective to configure the apparatus such that electric power is provided always directly from the $V_{DD}$ terminal 190 to an analog circuit such as an A/D converter because an insertion of the resistor to the power line may cause a low resolution in an analog circuit.

Further, the apparatus can be configured so that it includes a register and a selector thereby a selection of connection is performed between a state in which electric power is provided from the power source impedance control circuit 180 to all of the respective portions of the single-chip microcomputer 100 similarly to the first embodiment and a state in which electric power is provided directly from the $V_{DD}$ terminal 190 to a certain part of devices of the single-chip microcomputer 100 similarly to the second embodiment explained above.

EMBODIMENT 3.

The basic structure of a single-chip microcomputer of this embodiment is the same as that illustrated in FIG. 1 and duplicate explanations are omitted. However, the clock circuit 170 of the FIG. 1 is replaced with the clock circuit 170a.

Figure 9:
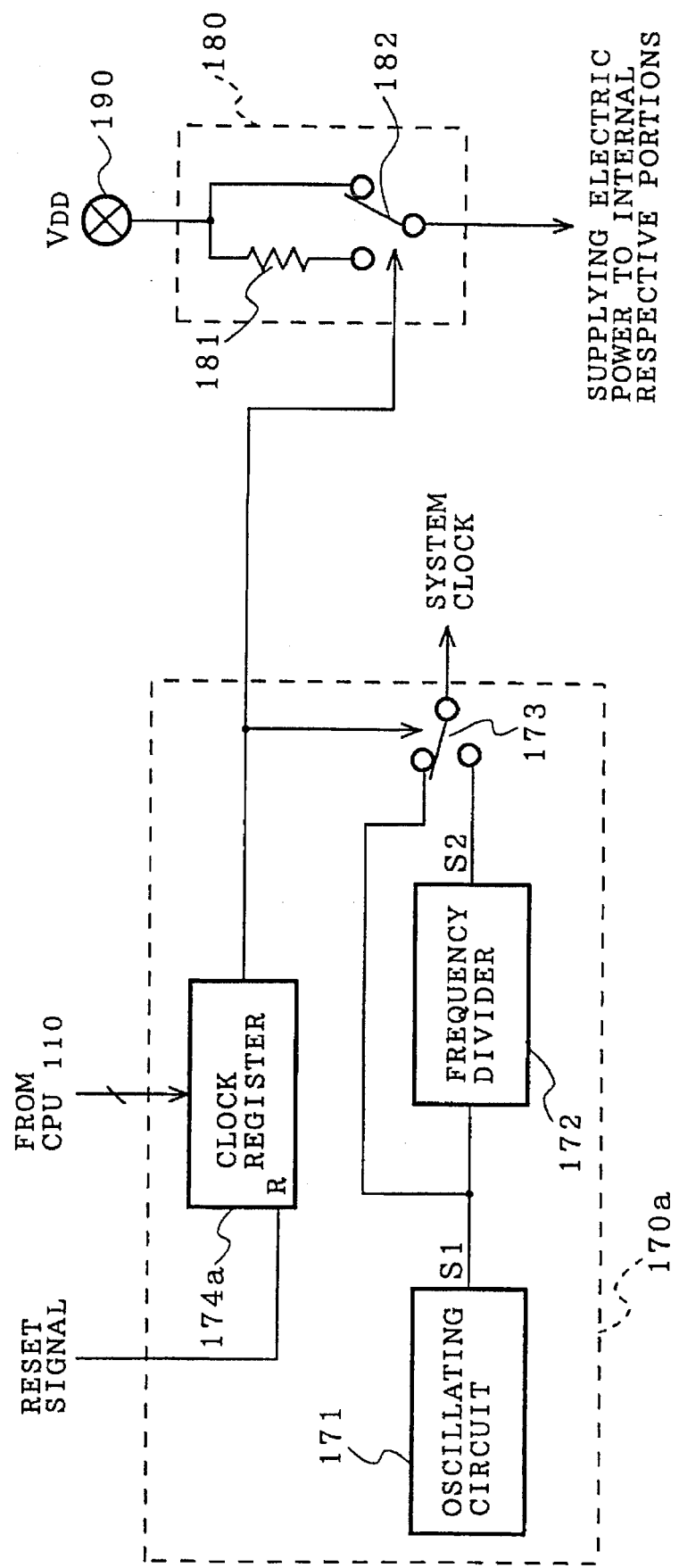
FIG. 9 is a block diagram showing a configuration of clock circuit and the power source impedance control circuit according to third embodiment.

FIG. 9 is a block diagram showing a configuration of clock circuit 170a and the power source impedance control circuit 180 according to this embodiment. The same reference numerals are attached to the same portions as those of FIG. 2 and duplicate explanations are omitted. The reference numeral 174a denotes a clock register with a reset function.

In this embodiment, an "H" signal is written in the clock register automatically when the single-chip microcomputer 100 is reset. With this configuration, in a case where a program to be initiated immediately after the computer 100 is reset requires a high speed operation, the computer 100 can shift to a high speed operation mode automatically without writing an "H" signal in the clock register 174a by the program.

However, the clock register 174a can be configured such that an "L" signal is written therein automatically. With this configuration, a low speed system clock and a high power source impedance are selected immediately after the computer 100 is reset, thereby it is effective when the reduction in electric power consumption is given priority over operation speed.

Additionally, this embodiment can be realized with the second embodiment explained above.

EMBODIMENT 4.

The basic structure of a single-chip microcomputer of this embodiment is the same as that illustrated in FIG. 1 and duplicate explanations are omitted. However, the clock circuit 170 of the FIG. 1 is replaced with the clock circuit 170b.

Figure 10:
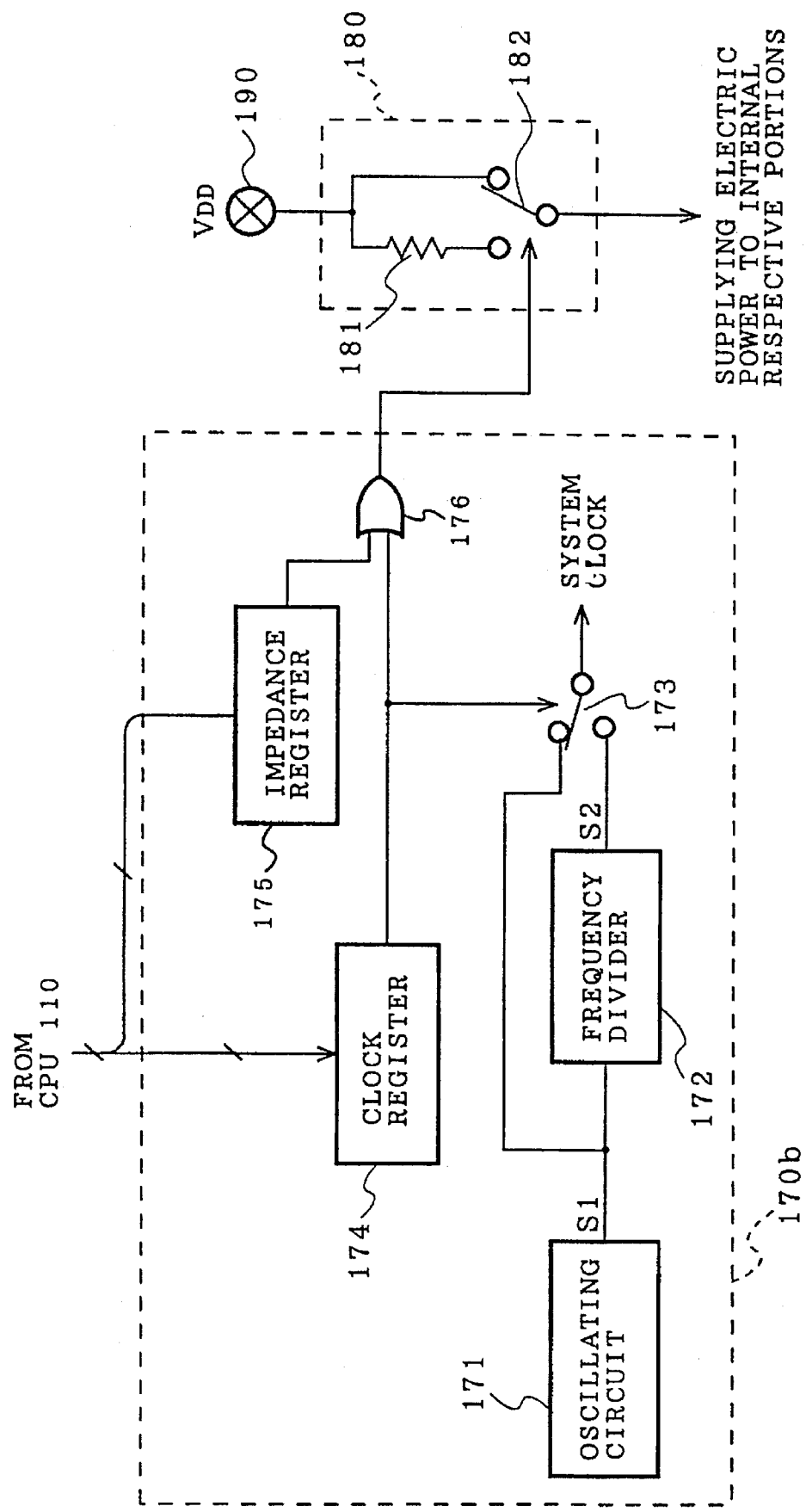
FIG. 10 is a block diagram showing a configuration of clock circuit and the power source impedance control circuit according to fourth embodiment.

FIG. 10 is a block diagram showing a configuration of clock circuit 170b and the power source impedance control circuit 180 according to this embodiment. The same reference numerals are attached to the same portions as those of FIG. 2 and duplicate explanations are omitted. The reference numeral 175 denotes an impedance register in which a value indicating a selection of a power source impedance in the power source impedance control circuit is stored, 176 denotes an OR gate which outputs a logical sum between an output signal of the clock register 174 and an output signal of the impedance register 175. When an "L" signal is written in the impedance register 175, the computer 100 operates in the same way as the first embodiment illustrated in FIGS. 1 and 2. That is, a speed of the system clock and a power source impedance are selected based on a value stored in the clock register 174 as shown in FIG. 3. On the other hand, an "H" signal is written in the impedance register 175, a power source impedance is set low irrespective of a value stored in the clock register 174. Therefore, when it is necessary to set power source impedance low temporarily in a case where system clock is of a slow speed, e.g., when an A/D converter operates, a power source impedance can be set low by writing an "H" signal in the impedance register 175.

Additionally, this embodiment can be realized with the second embodiment, the third embodiment, or the combination of the second and the third embodiments.

EMBODIMENT 5.

The basic structure of a single-chip microcomputer of this embodiment is the same as that illustrated in FIG. 1 and the duplicate explanations are omitted. However, the clock circuit 170 of the FIG. 1 is replaced with the clock circuit 170c.

Figure 11:
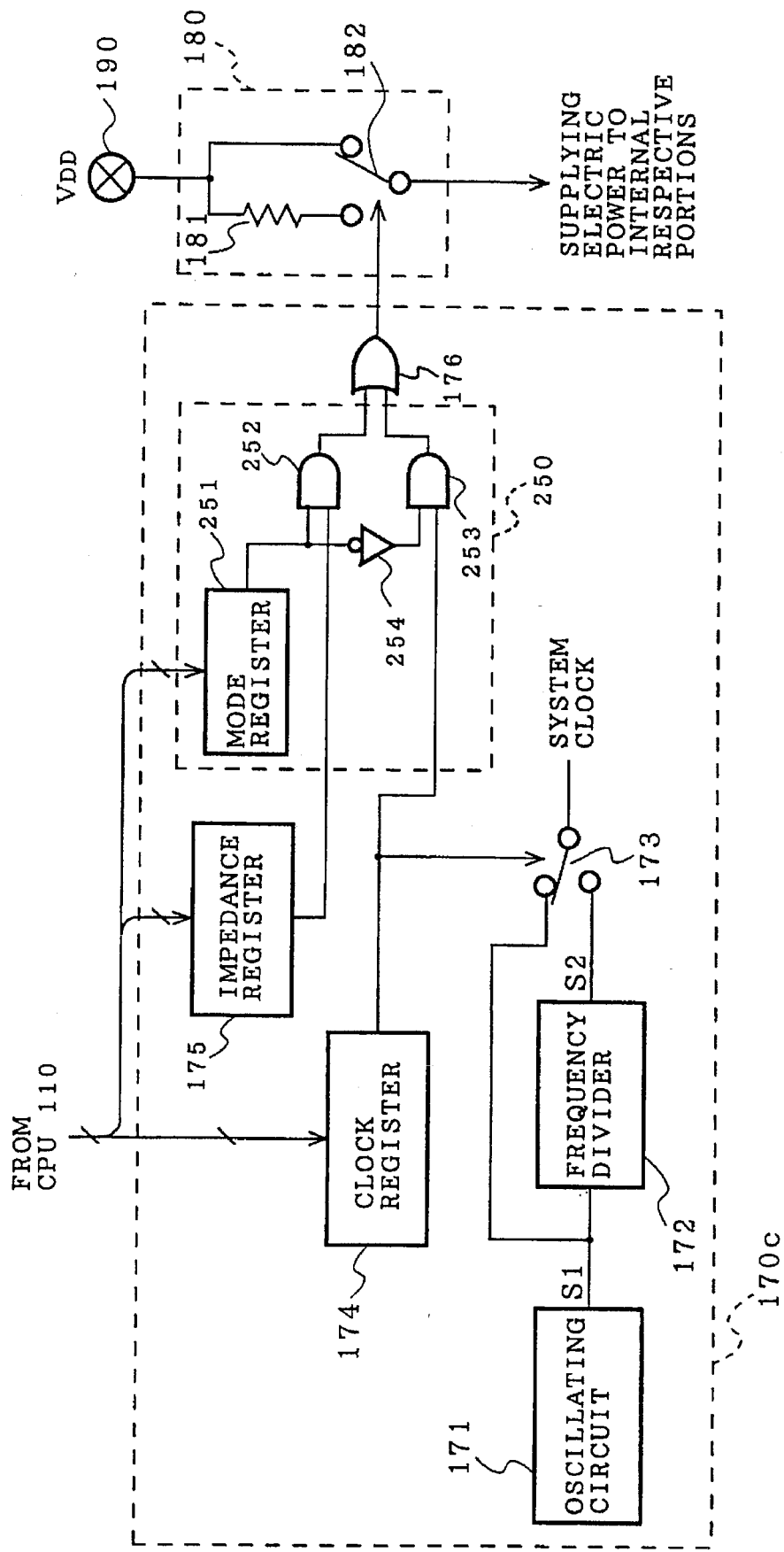
FIG. 11 is a block diagram showing a configuration of clock circuit and the power source impedance control circuit according to fifth embodiment.

FIG. 11 is a block diagram showing a configuration of clock circuit 170c and the power source impedance control circuit 180 according to this embodiment. The same reference numerals are attached to the same portions as those of FIG. 10 and duplicate explanations are omitted. The reference numeral 250 denotes a mode changing circuit which changes modes for controlling a power source impedance. The mode changing circuit 250 includes the mode register 251 for storing data indicating a mode selection, the AND gates 252 and 253, and the inverter 254.

The single-chip microcomputer of this embodiment has a system clock associated mode in which power source impedance is controlled based on the frequency of a system clock and an independent mode in which power source impedance is controlled independently of the frequency of a system clock.

Firstly, the system clock associated mode will be explained. In order to enter this mode, an "L" signal should be written in the mode register 251. When such a signal is written, an "L" signal is inputted to one of the input terminals of the AND gate 252 and the AND gate 252 continuously outputs an "L" signal, thereby the signal outputted from the impedance register 175 is masked. Therefore, the power source selector 182 is controlled based on a value stored in the clock register 174 similarly as the above explained first embodiment.

Next, the independent mode will be explained. In order to enter this mode, an "H" signal should be written in the mode register 251. When such a signal is written, an "L" signal which has been inverted by the inverter 254 is inputted to one of the input terminals of the AND gate 253 and the AND gate 253 continuously outputs an "L" signal, thereby the signal from the clock register 174 is masked. Therefore, the power selector 182 is controlled such that it selects one between the high impedance power line and the low impedance power line based on a value written in the impedance register 175 independently of the frequency of a system clock.

FIG. 12 is a table showing statuses of a system clock and a power source impedance when an "L" signal or an "H" signal is written in the mode register 251, the clock register 174 and the impedance register 175 respectively. As understood from the table, when an "L" signal is written in the mode register 251, a value stored in the impedance register 175 is ignored so that a system clock and a power source impedance are determined based on a value stored in the clock register 174 similarly as the case indicated in FIG. 3. On the other hand, when an "H" signal is written in the mode register 251, the frequency of a system clock is determined based on a value stored in the clock register 174 and a power source impedance is determined based on a value stored in the impedance register independently of the frequency of a system clock. The controlling a power source impedance independently of the frequency of a system clock may be applied to a case where spurious such as electromagnetic radiation from the computer is to be reduced by making high a power source impedance.

Additionally, this embodiment is realized with the second embodiment, the third embodiment, or the combination of the second and the third embodiments.

Further, the clock selector illustrated in the FIG. 4, the power source selectors illustrated in FIGS. 5 and 6, the power source impedance control circuit illustrated in FIG. 7 can be used in the second embodiment through the fifth embodiment in a similar way as explained in the first embodiment.

Furthermore, although only one frequency divider is used in the first embodiment through the fifth embodiment, one frequency can be selected from among three or more frequencies by providing two or more frequency dividers. Similarly, one power source impedance can be selected from among three or more power source impedances. In this case, the power source impedance can be selected from among three or more power source impedances depending on the selected frequency of a system clock.

What is claimed is:

1. A microcomputer having a plurality of units including a central processing unit operating according to a system clock, the microcomputer comprising:

a power input terminal for inputting electric power from outside of the microcomputer and for providing the electric power to the microcomputer;

pulse signal generating means for generating a plurality of pulse signals, each pulse signal having a different frequency;

means for generating a selection signal;

pulse signal selecting means for selecting a pulse signal from among the plurality of the pulse signals responsive to the selection signal inputted to the pulse signal selecting means and for outputting the selected pulse signal as the system clock; and power source impedance controlling means for controlling an impedance between the power input terminal and the plurality of units of the microcomputer based on a frequency of the selected pulse signal and for providing the inputted electric power to the plurality of units of the microcomputer.

2. A microcomputer according to claim 1, wherein the power source impedance controlling means lowers a value of an impedance between the power input terminal and the plurality of units of the microcomputer when a frequency of the selected pulse signal rises.

3. A microcomputer according to claim 2, wherein the pulse signal selecting means includes:

a clock register for storing information as to selection of one pulse signal from among the plurality of the pulse signals under a write operation of the central processing unit; and a clock selector for selecting one pulse signal from among the plurality of the pulse signals based on the information stored in said clock register, wherein the power source impedance controlling means controls the impedance based on the information stored in said clock register.

4. A microcomputer according to claim 3, further comprising:

an impedance register for storing information as to impedance control by the power source impedance controlling means under a write operation of the microcomputer; and signal outputting means for outputting a signal indicative of making the impedance lower when the information stored in the impedance register indicates that the impedance should be made lower even when the information stored in the clock register indicates that the impedance should be made higher, wherein the power source impedance controlling means controls the impedance based on the signal outputted from the signal outputting means.

5. A microcomputer according to claim 3, further comprising:

an impedance register for storing information as to impedance control by the power source impedance controlling means under a write operation of the microcomputer;

a mode register for storing information under a write operation of the central processing unit as to selection of one mode between a system clock associated mode in which the impedance is controlled based on the information stored in the clock register and an independent mode in which the impedance is controlled based on the information stored in the impedance register independently of the information stored in the clock register; and signal outputting means for outputting a signal from the clock register when the information indicative of the system clock associated mode is stored in the mode register and for outputting a signal from the impedance register when the information indicative of the independent mode is stored in the mode register, wherein the power source impedance controlling means controls the impedance based on a signal outputted from the signal outputting means.

6. A microcomputer according to claim 5, wherein the clock register includes means for storing information indicative of one preselected pulse signal from among the plurality of the pulse signals in the clock register when the microcomputer is reset.

7. A microcomputer according to claim 6, wherein said power source impedance controlling means includes:

a resistor connected serially to said power input terminal; and a power source selector for selecting a circuit line between a circuit line connected to said power input terminal via the resistor and a circuit line connected directly to the power input terminal.

8. A microcomputer according to claim 6, wherein said power source impedance controlling means includes:

a plurality of transistors having on-resistance values different from each other, each of the transistors being serially connected to said power input terminal; and a power source selector for selecting a circuit line from among circuit lines via the plurality of transistors respectively by turning on a corresponding transistor.

9. A microcomputer according to claim 8, wherein plurality of the units of the microcomputer includes an analog circuit.

10. A microcomputer according to claim 3, wherein the clock register includes means for storing information indicative of one preselected pulse signal from among the plurality of the pulse signals in the clock register when the microcomputer is reset.

11. A microcomputer according to claim 1, wherein the pulse signal selecting means includes:

a clock register for storing information as to selection of one pulse signal from among the plurality of the pulse signals under a write operation of the central processing unit; and a clock selector for selecting one pulse signal from among the plurality of the pulse signals based on the information stored in said clock register, wherein the power source impedance controlling means controls the impedance based on the information stored in said clock register.

12. A microcomputer according to claim 11, further comprising:

an impedance register for storing information as to impedance control by the power source impedance controlling means under a write operation of the microcomputer; and a signal outputting means for outputting a signal indicative of making the impedance lower when the information stored in the impedance register indicates that the impedance should be made lower even when the information stored in the clock register indicates that the impedance should be made higher, wherein the power source impedance controlling means controls the impedance based on the signal outputted from the signal outputting means.

13. A microcomputer according to claim 11, further comprising:

an impedance register for storing information as to impedance control by the power source impedance controlling means under a write operation of the microcomputer;

a mode register for storing information under a write operation of the central processing unit as to selection of one mode between a system clock associated mode in which the impedance is controlled based on the information stored in the clock register and an independent mode in which the impedance is controlled based on the information stored in the impedance register independently of the information stored in the clock register; and signal outputting means for outputting a signal from the clock register when the information indicative of the system clock associated mode is stored in the mode register and for outputting a signal from the impedance register when the information indicative of the independent mode is stored in the mode register, wherein the power source impedance controlling means controls the impedance based on a signal outputted from the signal outputting means.

14. A microcomputer according to claim 1, wherein said power source impedance controlling means includes:

a resistor connected serially to said power input terminal; and a power source selector for selecting a circuit line between a circuit line connected to said power input terminal via the resistor and a circuit line connected directly to the power input terminal.

15. A microcomputer according to claim 1, wherein said power source impedance controlling means includes:

a plurality of transistors having on-resistance values different from each other, each of the transistors being serially connected to said power input terminal; and a power source selector for selecting a circuit line from among circuit lines via the plurality of transistors respectively by turning on a corresponding transistor.

16. A microcomputer having a plurality of units including a central processing unit operating according to a system clock, the microcomputer comprising:

a power input terminal for inputting electric power from outside of the microcomputer and for providing the electric power to the microcomputer;

pulse signal generating means for generating a plurality of pulse signals, each pulse signal having a different frequency;

means for generating a selection signal;

pulse signal selecting means for selecting a pulse signal from among the plurality of the pulse signals responsive to the selection signal inputted to the pulse signal selecting means and for outputting the selected pulse signal as the system clock;

power source impedance controlling means for controlling an impedance between the power input terminal and a first part of the plurality of units of the microcomputer based on a frequency of the selected pulse signal for providing the inputted electric power to the first part of the plurality of units of the microcomputer; and electric power providing means for providing a second part of the plurality of units of the microcomputer with the electric power inputted to the power input terminal.

17. A microcomputer according to claim 16, wherein the power source impedance controlling means lowers a value of an impedance between the power input terminal and the first part of the plurality of units of the microcomputer when a frequency of the selected pulse signal rises.

18. A microcomputer according to claim 16, wherein the plurality of second part of the units of the microcomputer includes an analog circuit.

\* \* \* \* \*